(12) United States Patent
Anderson

(10) Patent No.: US 7,983,884 B2
(45) Date of Patent: Jul. 19, 2011

(54) WATER PARTICLE MANIPULATION

(75) Inventor: John Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 569 days.

(21) Appl. No.: 12/020,495

(22) Filed: Jan. 25, 2008

(65) Prior Publication Data

US 2008/0319722 A1    Dec. 25, 2008

Related U.S. Application Data

(63) Continuation of application No. 10/780,847, filed on Feb. 17, 2004, now Pat. No. 7,349,832.

(51) Int. Cl.
*G06G 7/50* (2006.01)

(52) U.S. Cl. .................... 703/9; 703/6; 345/474

(58) Field of Classification Search ............ 703/2, 6, 703/9; 345/473, 474
See application file for complete search history.

(56) References Cited

U.S. PATENT DOCUMENTS

| | | | | |
|---|---|---|---|---|
| 5,537,641 | A * | 7/1996 | da Vitoria Lobo et al. ... | 345/419 |
| 5,877,777 | A * | 3/1999 | Colwell ........................ | 345/473 |
| 6,266,071 | B1 * | 7/2001 | Stam et al. .................... | 345/473 |
| 7,085,689 | B2 * | 8/2006 | Davis et al. ................... | 703/2 |

OTHER PUBLICATIONS

Premoze et al., "Particle-Based Simulation of Fluids", Eurographics 2003, Sep. 2003.*
Osher et al., "Fronts Propagating with Curvature Dependent Speed: Algorithms Based on Hamilton-Jacobi Formulations", Journal of Computational Physics, 79, pp. 12-49, 1988.*
Yoon et al., "A Particle-Gridless Hybrid Method for Incompressible Flows", International Journal for Numerical Methods in Fluids, 30, pp. 407-424, 1999.*
Foster et al., "Practical Animation of Liquids", Proceedings of the 28th annual conference on Computer Graphics and Interactive Techniques, pp. 23-30, 2001.*

* cited by examiner

*Primary Examiner* — Kamini S Shah
*Assistant Examiner* — Herng-Der Day
(74) *Attorney, Agent, or Firm* — Law Office of Jonathan Hollander PC

(57) ABSTRACT

Realistic sprays for simulated fluids are created by adding a set of spray particles to a boundary region just below the fluid surface. The fluid surface is determined by solving a level set equation for a zero level corresponding to the fluid surface. Additionally, the boundary region is determined by solving the level set equation for a non-zero level corresponding to a surface at the specified depth from the fluid surface. The set of spray particles inherit an initial state, for example a velocity, from the fluid simulation. Subsequent motion of the spray particles is determined according to a ballistic simulation, rather than a fluid simulation, thereby substantially reducing the computational burden required to animate the fluid. Spray particles that sink below a specified depth from the fluid surface are removed.

24 Claims, 8 Drawing Sheets

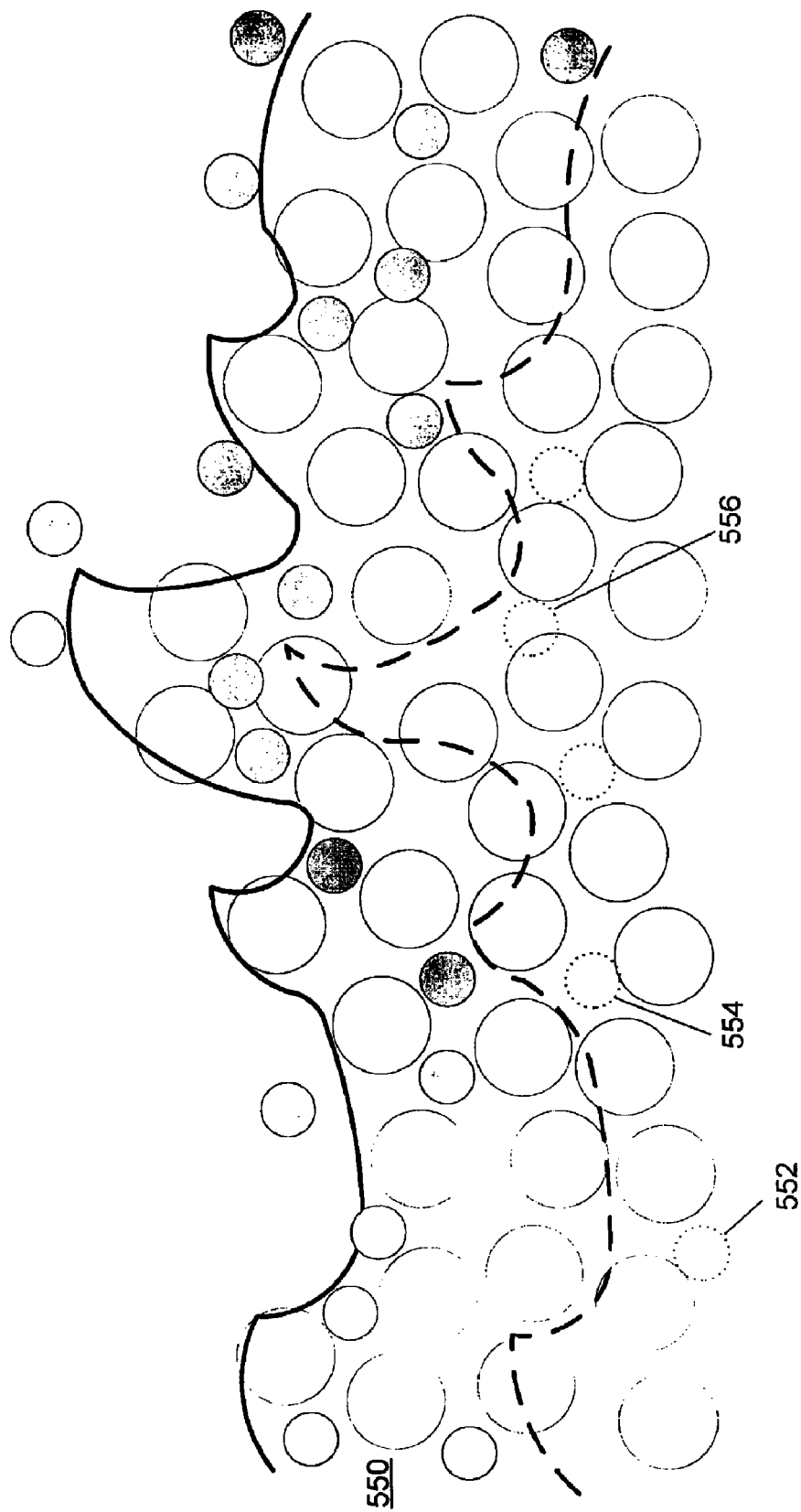

WATER PARTICLE MANIPULATION

CROSS-REFERENCE TO RELATED APPLICATIONS

This application is a continuation of U.S. patent application Ser. No. 10/780,847 filed Feb. 17, 2004, and entitled "Water Particle Manipulation," which issued as U.S. Pat. No. 7,349,832 on Mar. 25. 2008.

BACKGROUND OF THE INVENTION

The present invention relates to the field of computer graphics, and in particular to methods and apparatus for realistically animating water and other fluids. The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Realistically animating water and other fluids presents a particular challenge. The behavior of a fluid, for example a churning ocean, has a number of different characteristics that are difficult to animate by hand. To assist animators, simulations of fluid dynamics are often used to animate the fluid according to parameters defined by animators. In a typical fluid dynamics simulation, the fluid is modeled as a set of particles. The simulation solves a system of equations defining the dynamic behavior of the fluid to determine the motion of the set of particles. The result of the simulation is a set of particles imitating the behaviors of the fluid, such as waves, splashes, eddies, currents and ripples.

Although the set of particles animated by a typical simulation technique move, as a whole, like a fluid, it often does not look like a fluid if rendered directly. Typically, the number of particles in a set is too small to give the appearance of a continuous surface of a fluid. Some rendering techniques render particles as metaballs, which are "blobs" that stretch or deform themselves into a continuous "goo." However, metaballs give the surface of the fluid a lumpy appearance, similar to rice pudding, which is unacceptable for representing fluids such as water. Another rendering technique creates an isosurface from the set of particles. The isosurface creates a smooth, spatially-continuous fluid surface; however, this surface is temporally discontinuous due to frame-to-frame noise. As a results, the motion of the isosurface appears jerky and discontinuous.

One rendering technique to create a smooth-looking fluid from the set of particles creates a level set representing the fluid surface from the set of particles. The level set is created from a signed distance function of the set of particles. The values of the level set are adjusted for each frame of animation from the velocities of the set of particles. This results in a fluid surface that is spatially continuous, i.e. smooth-looking, and temporally continuous, i.e. smoothly-animated.

Although level-sets provide a smooth-looking fluid, the relatively small number of particles used for the simulation does not allow for the fluid to form "sprays" as waves break or recede. The resulting fluid appears sterile and artificial. Increasing the number of particles in the fluid simulation may allow for a more realistic spray; however, this greatly increases the computational burden of the simulation. Additionally, the use of additional simulation particles is wasteful, as the majority of particles, such as those below the fluid surface, do not form sprays.

It is therefore desirable to have a system and method for creating realistic-looking sprays for simulated fluids. It is further desirable that the sprays do not increase the computational burden of the fluid simulation or rendering.

BRIEF SUMMARY OF THE INVENTION

An embodiment of the invention creates realistic sprays for simulated fluids by adding a set of spray particles to a boundary region just below the fluid surface. The set of spray particles inherit an initial state, for example a velocity, from the fluid simulation. Subsequent motion of the spray particles is determined according to a ballistic simulation, rather than a fluid simulation, thereby substantially reducing the computational burden required to animate the fluid. Spray particles that sink below a specified depth from the fluid surface are removed.

In an embodiment, a method of animating a fluid includes determining a state of a set of fluid particles at a first instance of time using a fluid simulation and defining a fluid surface from the state of the set of fluid particles. A boundary region is then defined between the fluid surface and a specified depth from the fluid surface. A plurality of spray particles are added to the boundary region. The plurality of spray particles is assigned a state based derived from the state of the set of fluid particles. The plurality of spray particles are moved according to at least the state of the plurality of spray particles, and a portion of the plurality of spray particles that are located below the specified depth from the fluid surface are removed.

In a further embodiment, a ballistic simulation moves the plurality of spray particles. In an additional embodiment, the method includes rendering the fluid surface and rendering a portion of the plurality of spray particles located above the fluid surface.

In another embodiment, the fluid surface is determined by solving a level set equation for a zero level corresponding to the fluid surface. Additionally, the boundary region is determined by solving the level set equation for a non-zero level corresponding to a surface at the specified depth from the fluid surface.

BRIEF DESCRIPTION OF THE DRAWINGS

The invention will be described with reference to the drawings, in which:

FIGS. 4A-4F illustrate the creation of an animated fluid with sprays for an example fluid according to an embodiment of the invention.

DETAILED DESCRIPTION OF THE INVENTION

Figure 1:
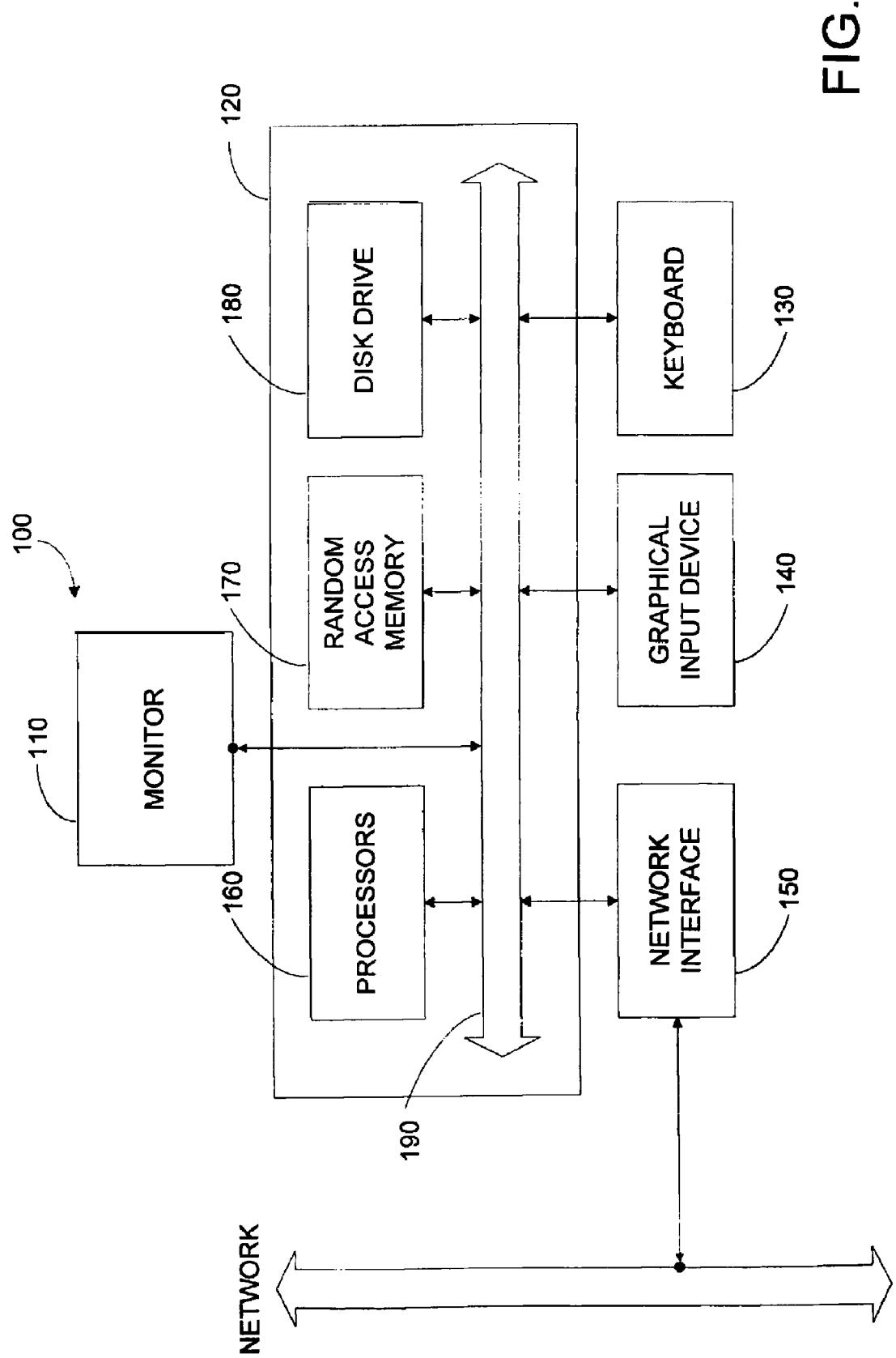
FIG. 1 illustrates a general-purpose computing system suitable for implementing an embodiment of the invention.

FIG. 1 illustrates an example computer system 100 capable of implementing an embodiment of the invention. Computer system 100 typically includes a monitor 110, computer 120, a keyboard 130, a user input device 140, and a network interface 150. User input device 140 includes a computer mouse, a trackball, a track pad, graphics tablet, touch screen, and/or other wired or wireless input devices that allow a user to create or select graphics, objects, icons, and/or text appearing on the monitor 110. Embodiments of network interface 150 typically provides wired or wireless communication with an electronic communications network, such as a local area network, a wide area network, for example the Internet, and/or virtual networks, for example a virtual private network (VPN).

Computer 120 typically includes components such as one or more general purpose processors 160, and memory storage devices, such as a random access memory (RAM) 170, disk drives 180, and system bus 190 interconnecting the above components. RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, and displacement maps. Further embodiments of computer 120 can include specialized audio and video subsystems for processing and outputting audio and graphics data. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Figure 2A:
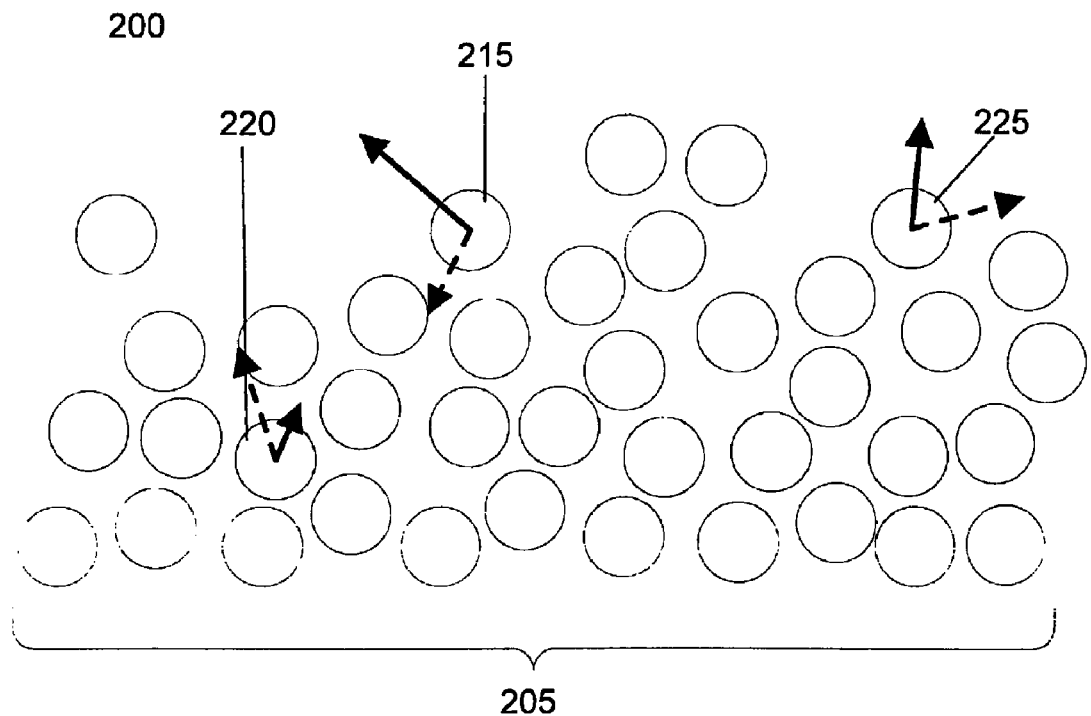
FIGS. 2A and 2B illustrate a prior technique for creating an animated fluid.
Figure 2B:
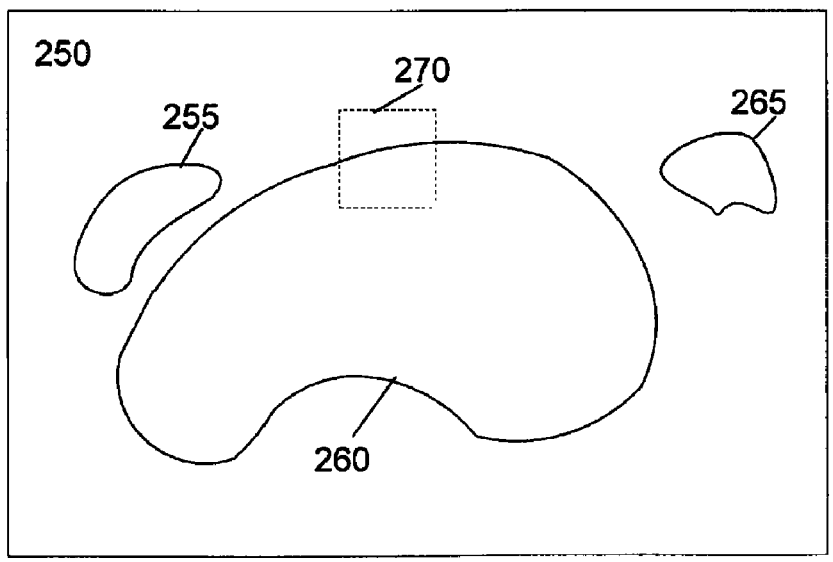

FIGS. 2A and 2B illustrate a prior technique for creating an animated fluid. FIG. 2A illustrates a close-up view of a fluid simulation 200 over a small region of the fluid surface. Simulation 200 models the behavior of a fluid as a set of particles 205. In FIGS. 2A and 2B, the fluid is animated in two-dimensions for clarity; however, fluids are typically animated in three-dimensions. The simulation 200 solves a system of fluid dynamics equations to determine the forces on each particle in the set 205, which in turn determines the acceleration, velocity, and position of each particle in the set 205. For example, particles 215, 220, and 225 each have a velocity, represented by a solid arrow, and an acceleration, represented by a dashed arrow. Together, these parameters represent at least a portion of the state of the set of particles 205. The simulation 200 determines the state of the set of particles 205 for each frame of the animation.

As discussed above, although the set of particles 205 behaves, as a whole, like a fluid, the set of particles 205 do not create the smooth, continuous surface needed for rendering the fluid. To create a smooth fluid surface, a level set is created from the set of particles. FIG. 2B illustrates an example level set 250 created from the state of the set of particles 205. Region 270 corresponds to the close up view of the particle simulation shown in FIG. 2A The level set 250 is a signed distance function giving a value corresponding to the distance from the surface of the fluid. Zero level lines 255, 260, and 265 represent the surface of the fluid, which are the portions of the level set with a value of zero. In the example of FIG. 2B, the zero level lines can be visualized as the outlines of drops of fluid resting on a flat sheet.

Figure 3:
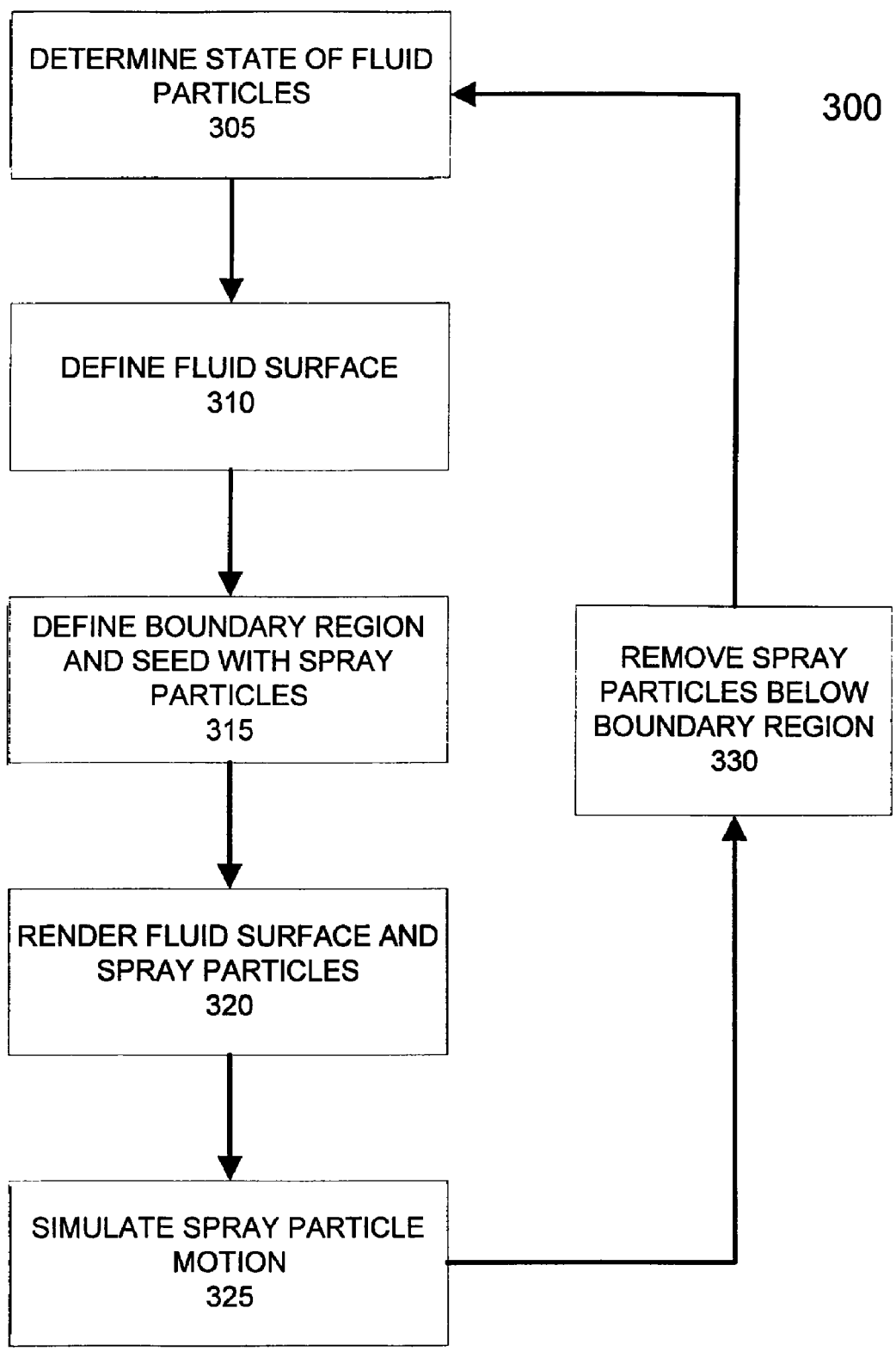
FIG. 3 illustrates a method for creating an animated fluid with sprays according to an embodiment of the invention.

FIG. 3 illustrates a method 300 for creating an animated fluid with sprays according to an embodiment of the invention. At step 305, the state of a set of fluid particles is determined for a given instant of time. In an embodiment, a fluid dynamics simulation using smooth particle hydrodynamics (SPH) is used to determine the forces on each one of the set of fluid particles, which in turn determines the state of the set of fluid particles at a given instant of time. In an example implementation, the fluid dynamics simulation determines the state of 10,000 to 1,000,000 fluid particles. Dynamic behaviours, such as waves, are initiated in the fluid dynamics simulation as pressure forces induced by collisions with boundary objects.

Following the determination of the state of the set of fluid particles, a fluid surface is defined from the state of the set of fluid particles at step 310. The purpose of step 310 is to create a continuous surface for the fluid to be used during rendering. In an embodiment, the fluid surface is the zero level of a level set. The level set is initialized using a signed distance function that represents the distance from an arbitrary point in space to the fluid surface forms the level set. In the case of a two-dimensional fluid, as shown in the examples, the level set is a three dimensional surface. In the case of a three-dimensional fluid, the level set is a four dimensional surface.

A level set equation is solved to determine the location of the zero level of the level set at a given point in time, t. An example level set equation is:

$$\phi_t F |\nabla \phi| = 0.$$

In this example equation, $\phi$ is the signed distance function to the zero level surface, which is a function of position and time, and the F represents the velocity of the zero level surface, which as discussed below is determined from the set of fluid particles. In an embodiment, the space around the set of fluid particles is discretized into a grid of points. The velocity values of fluid particles adjacent to grid points are weighted to determine an average velocity for each grid point. The average velocity of each grid point, in conjunction with the partial derivatives of the level set function are used to find the solution of the level set equation. In an example implementation, a "nudging" solver is used to solve the level set equation and to incrementally update the level set over time, allowing a solution that appears continuous over time but which does not diverge from the set of fluid particles. The solution of the level set equation defines the zero level surface at the given instant of time. In an embodiment, the surface of the fluid is created by trilinearly interpolating the position of zero level surface from the grid. The surface of the fluid can be rendered as a polygonal mesh using the values of the level set to determine surface normals.

Figure 4A:
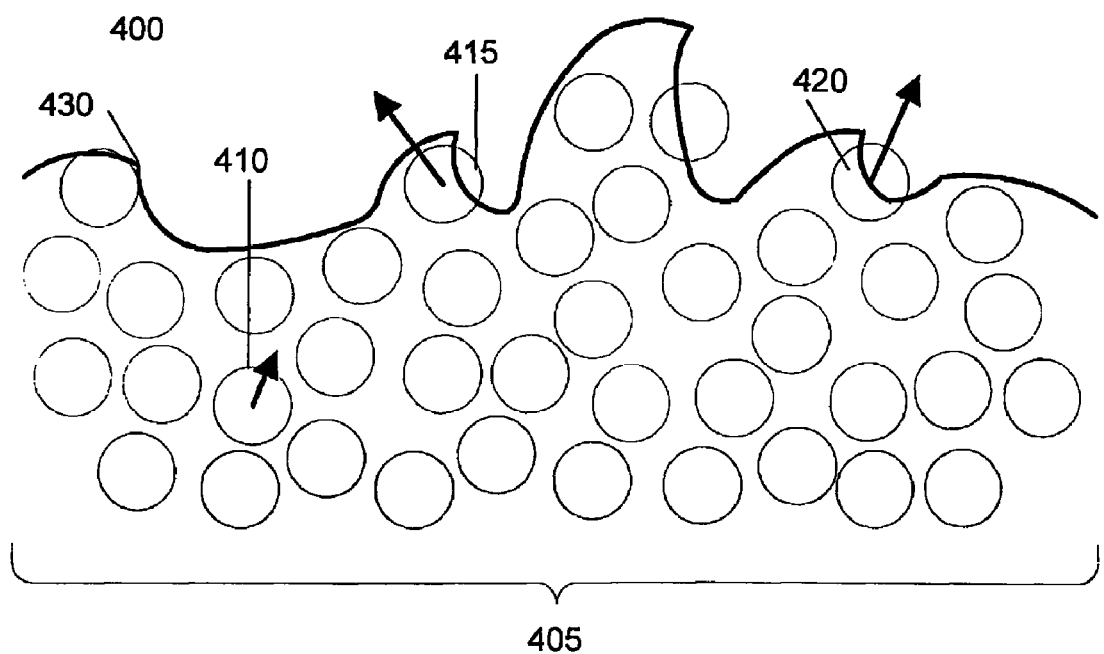
Figure 4B:
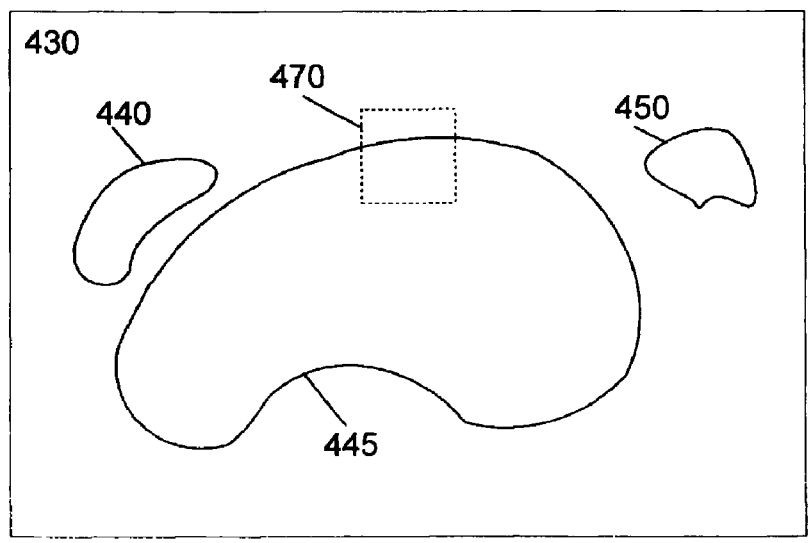

FIGS. 4A and 4B illustrate an example implementation of steps 305 and 310 of method 300. FIG. 4A illustrates a close-up view of a fluid simulation 400 over a small region of the fluid surface. Fluid simulation 400 models the behavior of a fluid as a set of particles 405. Simulation 400 solves a system of fluid dynamics equations to determine the forces on each particle in the set 405, which in turn determines the acceleration, velocity, and position of each particle in the set 405. For example, particles 410, 415, and 420 each have a velocity, represented by a solid arrow.

A level set 430 defining the surface of the fluid is created by weighting the velocities of particles adjacent to grid points to determine a velocity for each grid point. The velocity of the grid points, along with the partial derivatives of the level set function, are used to find the solution of the level set equation and thus the location of the zero level of the level set function at a given point of time. The zero level 430 corresponds to the surface of the fluid. FIG. 4B illustrates example level set 430 view from above. Contour lines 440, 445, and 450 indicate the portions of the level set 430 at the zero level. Region 470 corresponds to the close up view of the particle simulation shown in FIG. 4A.

Following step 310, in which a fluid surface is defined at a given instant of time, step 315 determines a boundary region to be used in the creation of spray. The boundary region is a region of the space just beneath the fluid surface. In an embodiment, the boundary region is determined from the level set function previously used to determine the fluid surface. In this embodiment, the level set equation is modified to solve for a non-zero level, for example one centimeter below the surface. An example level set equation for finding the desired non-zero level might be:

$$\phi_t + F|\nabla\phi| = -0.01$$

Because the level set function is based on the signed distance function, a boundary region any thickness can be defined by solving the level set equation for the desired thickness value. The resulting non-zero level corresponds to the inner surface of the boundary region, with the outer surface of the boundary region being the fluid surface.

Once the boundary region is defined, a set of spray particles is added, or seeded to the boundary region. The spray particles are assigned a velocity based on the weighted velocity of adjacent grid points. In an example implementation, the density of spray particles added to the boundary region ranges from ten to 100 times the density of the set of simulation particles.

Figure 4C:
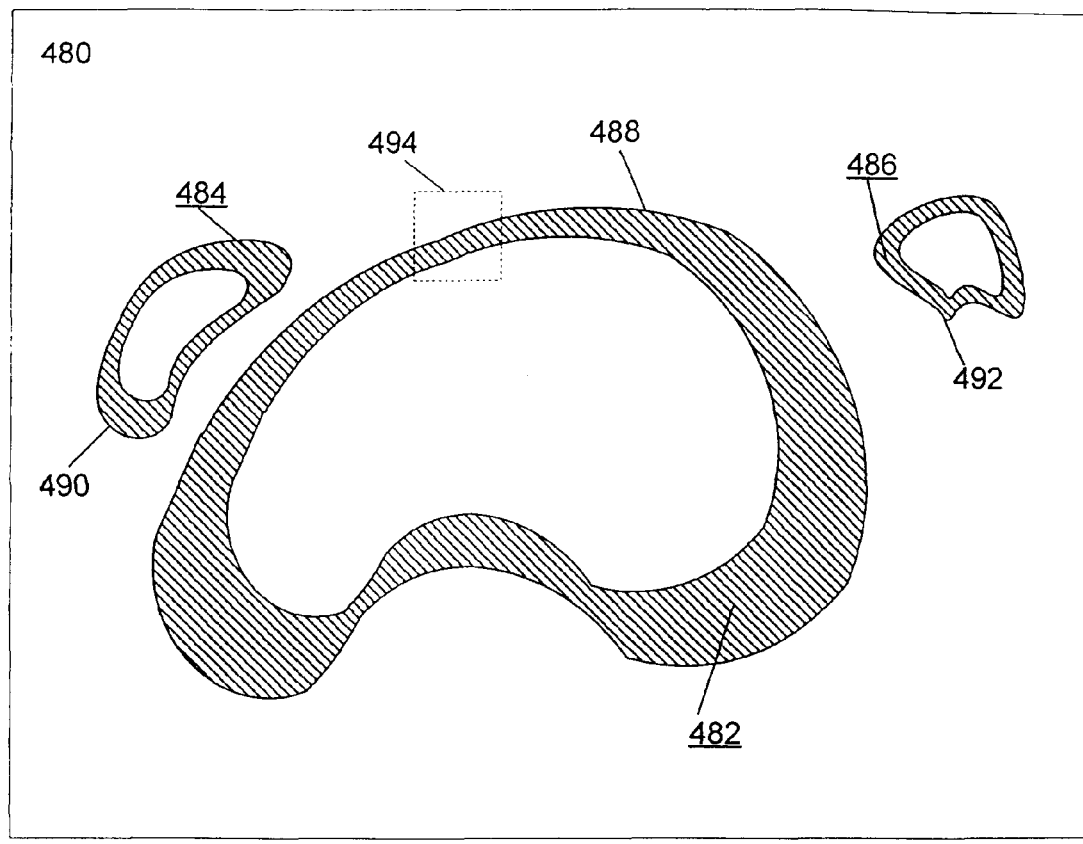
Figure 4D:
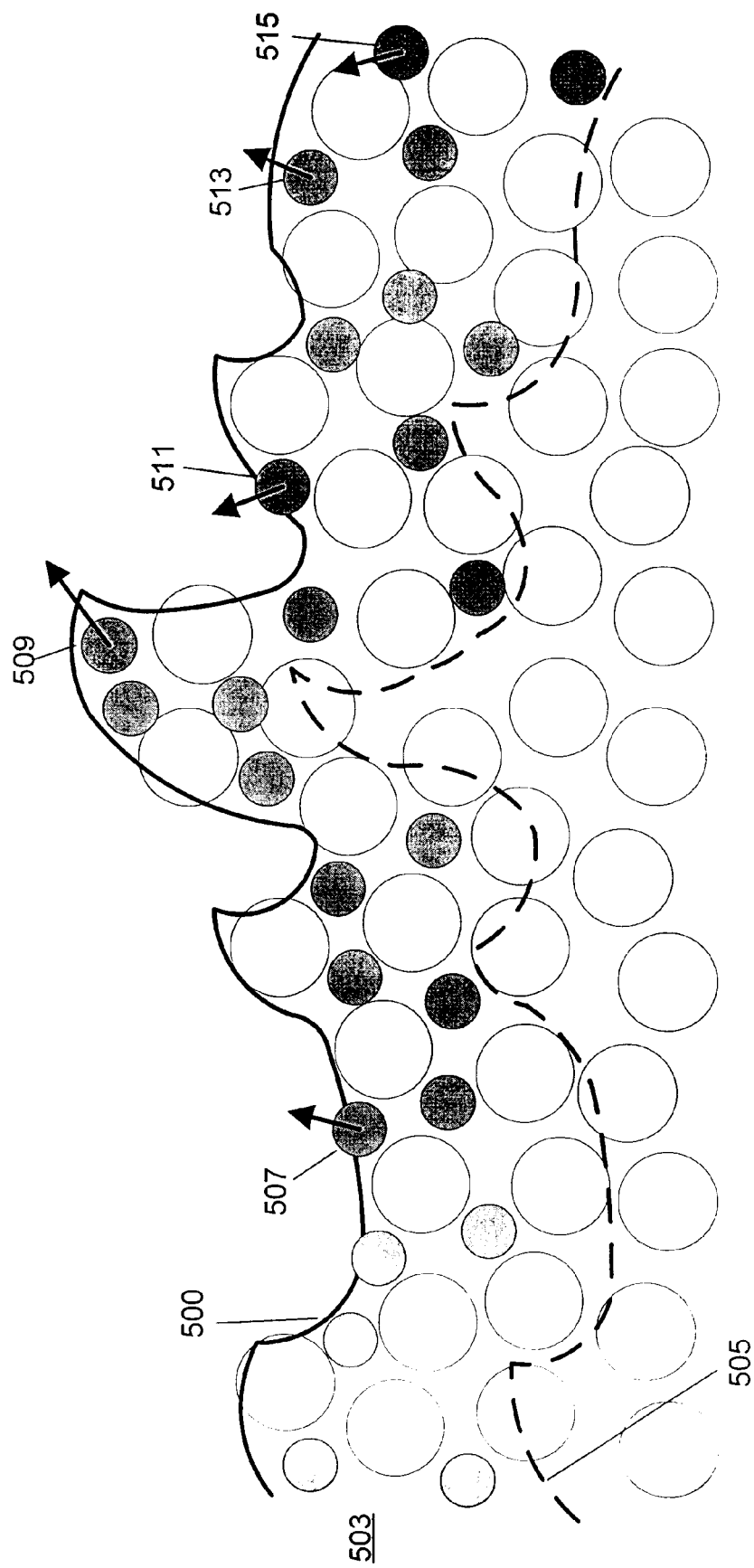

FIGS. 4C and 4D illustrate an example implementation of step 315. FIG. 4C illustrates an example level set 480. The level set 480 includes zero level boundaries 488, 490, and 492, representing the surface of the fluid. The boundary regions 482, 484, and 486 are formed in this example by finding a non-zero level of the level set function. Once the boundary region is defined, a set of spray particles are seeded into the boundary region.

FIG. 4D illustrates a close-up view of region 494 of FIG. 4C, showing the seeding of spray particles within the boundary region. Zero level 500, defining the surface of the fluid, and non-zero level 505 define the boundary region 503. Within the boundary region 503, a number of spray particles, shown in gray, have been added. Each spray particle is assigned a velocity based on the weighted average of the velocity of adjacent grid points. For example, spray particles 507, 509, 511, 513, and 515 have each been assigned a velocity, shown with an arrow.

At step 320, the zero level and the spray particles are rendered to create an output image. In an embodiment, spray particles are only rendered if they are above the surface of the fluid. Although initially all of the spray particles will be found within the boundary region underneath the fluid surface, eventually some spray particles will travel above the surface of the fluid, as discussed below. Rendering can be performed using any technique, for example ray-tracing or scanline rendering, in combination with lighting, shading, texture mapping, and any other image processing information to create a final image or frame. As it is often desirable to animate a fluid in the context of other entities, step 320 may also integrate unrelated objects, images, and other entities into the rendering. In an alternate embodiment, the location of the zero level and the spray particles is stored and rendering is deferred until a later time.

At step 325, the motion of the spray particles is simulated in preparation for the next frame of animation. Unlike the fluid particles, which are moved according to a complex fluid simulation, the spray particles are moved according to a ballistic simulation. For example, each spray particle is displaced by a distance equal to the product of its velocity and the time increment between frames. Each spray particle's velocity is then added to an acceleration vector, representing the force of gravity, with the result stored as the spray particle's new velocity. The acceleration vector, which determines how long a spray "floats," can be changed in value to achieve the desired aesthetic effect. Because the spray particles are not animated with a computationally expensive fluid simulation, the addition of the spray particles does not adversely effect the performance of the overall fluid animation. As discussed below, method 300 is repeated for each frame of fluid animation. It should be noted that step 325 simulates the motion of all of the spray particles in the system, including any remaining from previous iterations of the method 300.

Figure 4E:
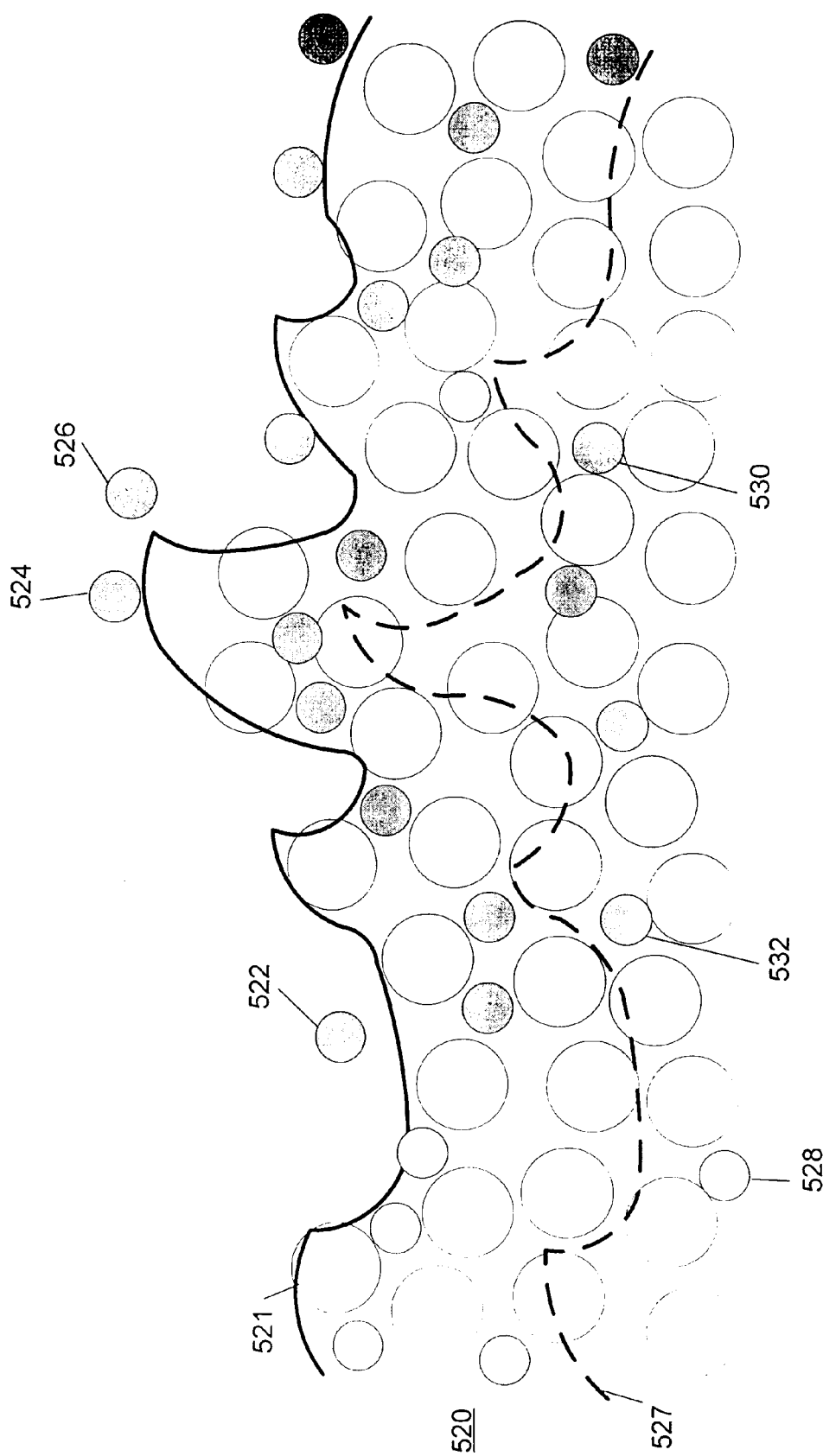

FIG. 4E illustrates an example implementation of step 325. In FIG. 4E, some of the spray particles, such as spray particles 522, 524, and 526, have traveled outside the boundary region 520 and above the fluid surface 521. Similarly, spray particles 528, 530, and 532 have sunk below the inner surface 527 of the boundary region 520.

In an embodiment, it is assumed that spray particles that sink below the boundary region will never rise above the fluid surface to become visible again. Thus, step 330 removes from the simulation the spray particles that have moved below the boundary region. FIG. 4F illustrates an example implementation of step 330, in which the spray particles 552, 554, and 556 have sunk below the boundary region 550 and have been removed. In FIG. 4F, the removed spray particles are shown in outline. In an embodiment, the same boundary region is used both for seeding new spray particles and removing old spray particles. However, alternate embodiments can define separate boundary regions for seeding new spray particles and removing old spray particles.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of animating a surface, the method comprising:

receiving an initial surface defining initial values of a level set function at an initial time value;

receiving a first state of a particle system at a first time value, wherein the first state of the particle system includes particle positions and particle velocities;

defining a particle velocity field from the particle positions and particle velocities of the first state of the particle system;

solving a level set equation using a processor based on the particle velocity field, the particle positions, and the initial values of the level set function to determine values of the level set function at the first time value; and defining the surface at the first time value using the values of the level set function at the first time value;

wherein defining the particle velocity field comprises:

defining a grid point associated with the level set function in a space including at least fluid particles of the particle system;

identifying a portion of the fluid particles of the particle system positioned adjacent to the grid point; and defining the particle velocity field by determining a velocity value for the grid point based on the article velocities of the portion of the fluid particles of the particle system.

2. The method of claim 1, wherein defining the surface at the first time value comprises:
    determining a subset of the values of the level set function at the first time value having a value of zero.

3. The method of claim 2, wherein determining the subset of the values of the level set function at the first time value having the value of zero comprises:
    interpolating between a portion of the values of the level set function at the first time to determine a location of the level set function at the first time value having the value of zero.

4. The method of claim 1, wherein the level set function is a signed distance function specifying distances from points in space to the surface.

5. The method of claim 1, comprising:
    rendering the surface at the first time value.

6. The method of claim 1, comprising:
    storing the surface at the first time value.

7. The method of claim 1, wherein defining the surface at the first time value comprises:
    defining a polygonal mesh representing the surface at the first time value from the values of the level set function at the first time value.

8. The method of claim 7, wherein defining the surface at the first time value comprises:
    defining surface normals of the polygonal mesh at the first time value from the values of the level set function at the first time value.

9. The method of claim 1, further comprising:
    receiving a second state of the particle system at a second time value, wherein the second state of the particle system includes second particle positions and second particle velocities;
    defining a second particle velocity field from the second particle positions and second particle velocities of the second state of the particle system;
    solving a second level set equation based on the second particle velocity field and the values of the level set function at the first time value to determine values of the level set function at the second time value; and
    defining a surface at the second time value using the values of the level set function at the second time value.

10. The method of claim 1, wherein the particle system is a fluid particle system.

11. The method of claim 10, wherein receiving a first state of a particle system at a first time value comprises:
    simulating the fluid particle system according to a fluid simulation to determine the particle positions and particle velocities of the first state of the particle system.

12. The method of claim 1, comprising:
    determining a second state of the particle system at a second time value, wherein the second state of the particle system includes second particle positions and second particle velocities;
    defining a second particle velocity field from the second particle positions and second particle velocities of the second state of the particle system;
    solving a second level set equation based on the second particle velocity field, the second particle positions, and the values of the level set function at the first time value to determine values of the level set function at the second time value; and
    defining a surface at the second time value using the values of the level set function at the second time value.

13. A non-transitory computer-readable storage medium including instructions adapted to direct a computer to perform an operation, the operation comprising:
    receiving an initial surface defining initial values of a level set function at an initial time value;
    receiving a first state of a particle system at a first time value, wherein the first state of the particle system includes particle positions and particle velocities;
    defining a particle velocity field from the particle positions and particle velocities of the first state of the particle system;
    solving a level set equation based on the particle velocity field, the particle positions, and the initial values of the level set function to determine values of the level set function at the first time value; and
    defining a surface at the first time value using the values of the level set function at the first time value;
    wherein defining the particle velocity field comprises:
        defining a grid point associated with the level set function in a space including at least fluid particles of the particle system;
        identifying a portion of the fluid particles of the particle system positioned adjacent to the grid point;
        defining the particle velocity field by determining a velocity value for the grid point based on the particle velocities of the portion of the fluid particles of the particle system.

14. The computer-readable storage medium of claim 13, wherein defining the surface at the first time value comprises:
    determining a subset of the values of the level set function at the first time value having a value of zero.

15. The computer-readable storage medium of claim 14, wherein determining the subset of the values of the level set function at the first time value having the value of zero comprises:
    interpolating between a portion of the values of the level set function at the first time to determine a location of the level set function at the first time value having the value of zero.

16. The computer-readable storage medium of claim 13, wherein the level set function is a signed distance function specifying distances from points in space to the surface.

17. The computer-readable storage medium of claim 13, comprising additional instructions adapted to direct the computer to perform an additional operation, the additional operation comprising:
    rendering the surface at the first time value.

18. The computer-readable storage medium of claim 13, comprising additional instructions adapted to direct the computer to perform an additional operation, the additional operation comprising:
    storing the surface at the first time value.

19. The computer-readable storage medium of claim 13, wherein defining the surface at the first time value comprises:
    defining a polygonal mesh representing the surface at the first time value from the values of the level set function at the first time value.

20. The computer-readable storage medium of claim 19, wherein defining the surface at the first time value comprises:
    defining surface normals of the polygonal mesh at the first time value from the values of the level set function at the first time value.

21. The computer-readable storage medium of claim 13, further comprising additional instructions adapted to direct the computer to perform an additional operation, the additional operation comprising:
    receiving a second state of the particle system at a second time value, wherein the second state of the particle system includes second particle positions and second particle velocities;

defining a second particle velocity field from the second particle positions and second particle velocities of the second state of the particle system;

solving a second level set equation based on the second particle velocity field and the values of the level set function at the first time value to determine values of the level set function at the second time value; and defining a surface at the second time value using the values of the level set function at the second time value.

22. The computer-readable storage medium of claim 13, wherein the particle system is a fluid particle system.

23. The computer-readable storage medium of claim 22, wherein receiving a first state of a particle system at a first time value comprises:

simulating the fluid particle system according to a fluid simulation to determine the particle positions and particle velocities of the first state of the particle system.

24. The computer-readable storage medium of claim 13, comprising additional instructions adapted to direct the computer to perform an additional operation, the additional operation comprising:

determining a second state of the particle system at a second time value, wherein the second state of the particle system includes second particle positions and second particle velocities;

defining a second particle velocity field from the second particle positions and second particle velocities of the second state of the particle system;

solving a second level set equation based on the second particle velocity field, the second particle positions, and the values of the level set function at the first time value to determine values of the level set function at the second time value; and defining a surface at the second time value using the values of the level set function at the second time value.

* * * * *